United States Patent
Ono et al.

(10) Patent No.: US 7,787,037 B2
(45) Date of Patent: Aug. 31, 2010

(54) IMAGING METHOD THAT CONTINUOUSLY OUTPUTS A SIGNAL BASED ON ELECTRIC CHARGES GENERATED BY A SELECTED PIXEL UNIT WITHOUT PERFORMING AN OPERATION OF DESELECTING THE SELECTED PIXEL UNIT

(75) Inventors: Toshiaki Ono, Ebina (JP); Tomoyuki Noda, Atsugi (JP); Hidekazu Takahashi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/623,052

(22) Filed: Nov. 20, 2009

(65) Prior Publication Data

US 2010/0066884 A1 Mar. 18, 2010

Related U.S. Application Data

(63) Continuation of application No. 12/033,924, filed on Feb. 20, 2008, now abandoned.

(30) Foreign Application Priority Data

Mar. 2, 2007 (JP) ............... 2007-053340

(51) Int. Cl.
*H04N 9/64* (2006.01)
*H04N 3/14* (2006.01)
*H04N 5/335* (2006.01)

(52) U.S. Cl. .................. 348/296; 348/248; 348/300

(58) Field of Classification Search ............. 348/241, 348/248, 296, 300, 301, 308, 313, 362
See application file for complete search history.

(56) References Cited

U.S. PATENT DOCUMENTS

| | | | |
|---|---|---|---|
| 6,043,478 A | 3/2000 | Wang | 250/208.1 |
| 6,115,066 A | 9/2000 | Gowda et al. | 348/308 |
| 6,441,849 B1 | 8/2002 | Fukuda | 348/230 |
| 7,176,434 B2 | 2/2007 | Altice, Jr. et al. | 250/208.1 |
| 7,180,544 B2 | 2/2007 | Yamaguchi et al. | 348/308 |

(Continued)

FOREIGN PATENT DOCUMENTS

JP 2004-172950 A 6/2004

(Continued)

*Primary Examiner*—Sinh Tran
*Assistant Examiner*—Daniel M Pasiewicz
(74) *Attorney, Agent, or Firm*—Fitzpatrick, Cella, Harper & Scinto

(57) ABSTRACT

An imaging apparatus includes a pixel unit array and a driving unit. Each pixel unit includes a plurality of photoelectric conversion units, a charge-voltage converter common to the plurality of photoelectric conversion units, a plurality of transfer units which transfer electric charges generated by the plurality of photoelectric conversion units to the charge-voltage converter, an output unit which outputs a signal based on the electric charges to a signal line, and a setting unit which sets the electric potential of the charge-voltage converter. Each pixel unit is selected or deselected in accordance with the electric potential set in the charge-voltage converter. The driving unit drives the pixel unit array so that the output unit continuously outputs, to the signal line, the signal based on the electric charges generated by the plurality of photoelectric conversion units in the selected pixel unit without performing an operation of deselecting the selected pixel unit.

5 Claims, 8 Drawing Sheets

U.S. PATENT DOCUMENTS

| | | |
|---|---|---|
| 7,187,410 B2 | 3/2007 | Yamaguchi et al. .......... 348/308 |
| 7,277,130 B2 | 10/2007 | Korthout et al. ............ 348/308 |
| 7,485,836 B2 | 2/2009 | Altice, Jr. et al. ........ 250/208.1 |
| 7,489,352 B2 | 2/2009 | Nakamura .................. 348/296 |
| 2005/0179795 A1 | 8/2005 | Funatsu et al. .............. 348/302 |
| 2006/0001751 A1 | 1/2006 | Abe et al. ................... 348/300 |
| 2006/0050161 A1 | 3/2006 | Inagaki et al. ............... 348/300 |
| 2007/0115377 A1 | 5/2007 | Noda et al. .................. 348/294 |
| 2008/0036890 A1 | 2/2008 | Yamashita et al. .......... 348/308 |
| 2008/0036891 A1 | 2/2008 | Ono et al. .................... 348/308 |
| 2008/0211950 A1 | 9/2008 | Ono et al. .................... 348/308 |

FOREIGN PATENT DOCUMENTS

| | | |
|---|---|---|
| KR | 2008-0080948 A | 9/2008 |

FIG. 6

DRIVING TIMING IN FIG. 4

| RESET FD OF SELECTED ROW TO HIGH ELECTRIC POTENTIAL | READ OUT ELECTRIC CHARGES OF FIRST PHOTO-ELECTRIC CONVERSION UNIT | RESET FD OF SELECTED ROW TO HIGH ELECTRIC POTENTIAL | READ OUT ELECTRIC CHARGES OF SECOND PHOTO-ELECTRIC CONVERSION UNIT | SWEEP ELECTRIC CHARGES OF FIRST AND SECOND PHOTO-ELECTRIC CONVERSION UNITS | RESET FDS OF ALL ROWS TO LOW ELECTRIC POTENTIAL |

⟵ HT ⟶

DRIVING TIMING IN FIG. 5

| SWEEP ELECTRIC CHARGES OF FIRST PHOTO-ELECTRIC CONVERSION UNIT | RESET FDS OF ALL ROWS TO LOW ELECTRIC POTENTIAL | RESET FD OF SELECTED ROW TO HIGH ELECTRIC POTENTIAL | READ OUT ELECTRIC CHARGES OF FIRST PHOTO-ELECTRIC CONVERSION UNIT | SWEEP ELECTRIC CHARGES OF SECOND PHOTO-ELECTRIC CONVERSION UNIT | RESET FDS OF ALL ROWS TO LOW ELECTRIC POTENTIAL | RESET FD OF SELECTED ROW TO HIGH ELECTRIC POTENTIAL | READ OUT ELECTRIC CHARGES OF SECOND PHOTO-ELECTRIC CONVERSION UNIT |

⟵ HTa ⟶

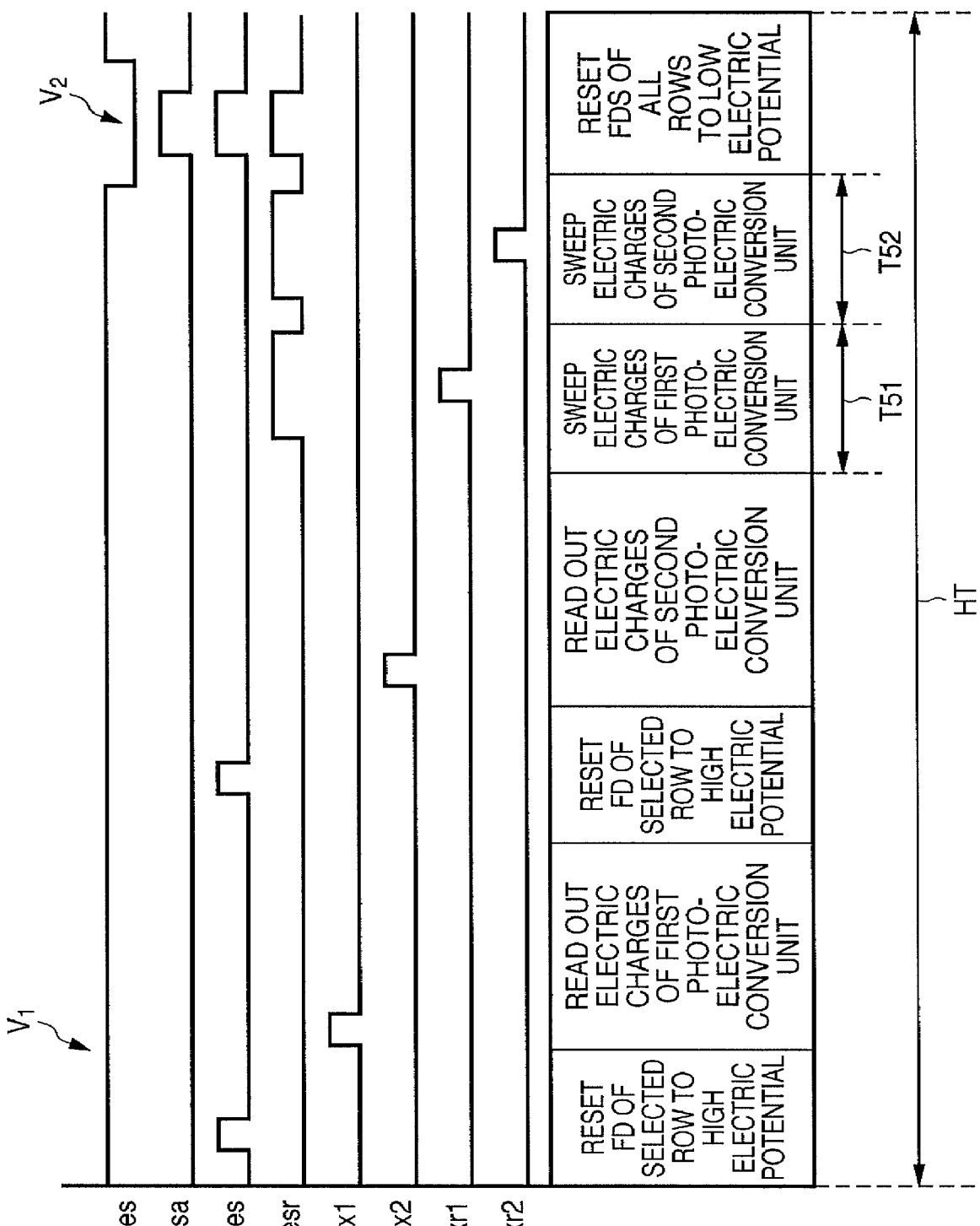

IMAGING METHOD THAT CONTINUOUSLY OUTPUTS A SIGNAL BASED ON ELECTRIC CHARGES GENERATED BY A SELECTED PIXEL UNIT WITHOUT PERFORMING AN OPERATION OF DESELECTING THE SELECTED PIXEL UNIT

BACKGROUND OF THE INVENTION

1. Field of the Invention

The present invention relates to an imaging apparatus and an imaging system.

2. Description of the Related Art

A pixel unit where a selection transistor is excluded and a plurality of photoelectric conversion units share a reset transistor and an amplification transistor has been proposed for reducing a pixel area in an imaging apparatus such as a CMOS image sensor, as disclosed in Japanese Patent Laid-Open No. 2004-172950.

In the technique disclosed in Japanese Patent Laid-Open No. 2004-172950, a global selection signal line is set to a low electric potential, and the reset transistors of all pixel units are turned on every time a signal is read out, thereby deselecting all pixel units. Then, the global selection signal line is set to a high electric potential, and the reset transistors of selected pixel units are turned on, thereby selecting only the selected pixel units. That is, it is necessary to frequently switch the electric potential of the global selection signal line. The global selection signal line is connected to all pixel units. For this reason, when the number of pixel units increases, the parasitic capacitance of the line increases, and the charge/discharge time becomes long. Hence, a long time is required to switch the electric potential in reading out a signal from a pixel unit. It is therefore difficult to read out a signal from a pixel unit at a high speed.

SUMMARY OF THE INVENTION

The present invention provides an imaging apparatus and an imaging system which can read out a signal from pixel units at a high speed.

According to the first aspect of the present invention, there is provided an imaging apparatus comprising a pixel unit array having a plurality of pixel units arrayed two-dimensionally, and a driving unit which drives the pixel unit array, characterized in that each of the pixel units comprises a plurality of photoelectric conversion units, a charge-voltage converter common to the plurality of photoelectric conversion units, a plurality of transfer units which transfer electric charges generated by the plurality of photoelectric conversion units to the charge-voltage converter, an output unit which outputs a signal based on the electric charges transferred to the charge-voltage converter to a signal line, and a setting unit which sets an electric potential of the charge-voltage converter, and each pixel unit is selected or deselected in accordance with the electric potential set in the charge-voltage converter by the setting unit, and the driving unit drives the pixel unit array so that the output unit continuously outputs, to the signal line, the signal based on the electric charges generated by the plurality of photoelectric conversion units in the selected pixel unit without performing an operation of deselecting the selected pixel unit.

According to the second aspect of the present invention, there is provided an imaging system characterized by comprising an imaging apparatus according to the first aspect of the present invention, an optical system which guides light to the pixel array of the imaging apparatus, and a signal processing unit which processes a signal output from the imaging apparatus to generate image data.

According to the present invention, it is possible to read out a signal from pixel units at a high speed.

Further features of the present invention will become apparent from the following description of exemplary embodiments with reference to the attached drawings.

BRIEF DESCRIPTION OF THE DRAWINGS

FIG. 6 is a schematic view showing the comparison between the driving timing in FIG. 4 and that in FIG. 5;

FIG. 7 is a timing chart showing the driving timing of an imaging apparatus according to a modification of the embodiment of the present invention.

DESCRIPTION OF THE EMBODIMENTS

Figure 1:
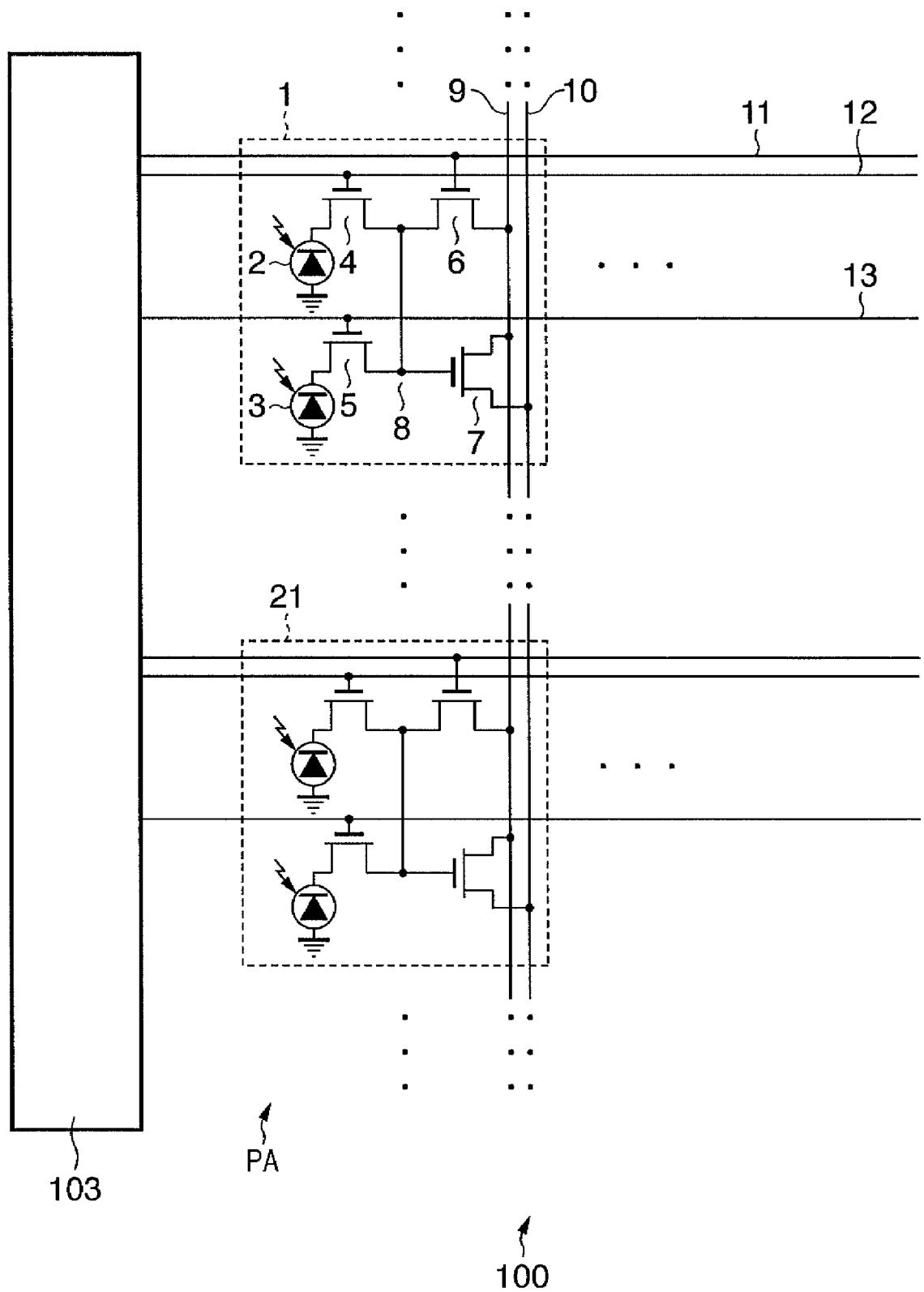
FIG. 1 is a circuit diagram showing the arrangement of an imaging apparatus according to an embodiment of the present invention.

An imaging apparatus 100 according to an embodiment of the present invention will be described with reference to FIG. 1. FIG. 1 is a circuit diagram showing the arrangement of the imaging apparatus 100 according to the embodiment of the present invention. All MOS transistors shown in FIG. 1 are of N type. A MOS transistor is turned on at a high gate potential and off at a low gate potential.

The imaging apparatus 100 comprises a pixel unit array PA and a driving unit 103, as shown in FIG. 1.

The driving unit 103 is arranged at the periphery of the pixel unit array PA. The driving unit 103 drives a plurality of pixel units in the pixel unit array PA. The driving unit 103 is, e.g., a vertical shift register which scans the pixel unit array PA in the vertical direction.

FIG. 1 does not illustrate a readout circuit for reading out a signal output to a column signal line 10 of each column, and a horizontal shift register for scanning the readout circuit in the horizontal direction.

The pixel unit array PA includes a plurality of pixel units (1, 21, . . . ) arrayed (two-dimensionally arrayed) in the row and column directions.

The pixel unit 1 includes a plurality of photoelectric conversion units (2 and 3), a charge-voltage converter 8, a plurality of transfer units (4 and 5), an output unit 7, and a setting unit 6. That is, in the pixel unit 1, the output unit 7 and setting unit 6 are commonly provided for a plurality of pixels (a plurality of photoelectric conversion units).

The plurality of photoelectric conversion units (2 and 3) include the first photoelectric conversion unit 2 and second photoelectric conversion unit 3. The first photoelectric conversion unit 2 generates and accumulates electric charges corresponding to incident light. The first photoelectric conversion unit 2 is, e.g., a photodiode (PD) for accumulating negative electric charges (electrons). The second photoelectric conversion unit 3 generates and accumulates electric charges corresponding to incident light. The second photoelectric conversion unit 3 is, e.g., a photodiode (PD) for accumulating negative electric charges (electrons).

The charge-voltage converter 8 is commonly provided for the plurality of photoelectric conversion units (2 and 3). The charge-voltage converter 8 serves as an input unit of the output unit 7 (to be described later). The charge-voltage converter 8 converts electric charges generated by the plurality of photoelectric conversion units (2 and 3) into a voltage and holds it. More specifically, the charge-voltage converter 8 holds a signal (voltage) based on electric charges generated by the plurality of photoelectric conversion units (2 and 3). The charge-voltage converter 8 is, e.g., a floating diffusion (FD).

The plurality of transfer units (4 and 5) transfer electric charges generated by the plurality of photoelectric conversion units (2 and 3) to the charge-voltage converter 8. More specifically, the plurality of transfer units (4 and 5) receive a signal that goes active at different timings and transfer electric charges generated by the plurality of photoelectric conversion units (2 and 3) to the charge-voltage converter 8 at different timings. The plurality of transfer units (4 and 5) include the first transfer unit 4 and second transfer unit 5. The first transfer unit 4 transfers electric charges accumulated in the first photoelectric conversion unit 2 to the charge-voltage converter 8 at a predetermined timing. The first transfer unit 4 is, e.g., a transfer MOS transistor. The second transfer unit 5 transfers electric charges accumulated in the second photoelectric conversion unit 3 to the charge-voltage converter 8 at a predetermined timing. The second transfer unit 5 is, e.g., a transfer MOS transistor.

The output unit 7 outputs a signal based on electric charges transferred to the charge-voltage converter 8 to the column signal line 10. In outputting, the output unit 7 amplifies the signal based on electric charges. The output unit 7 is, e.g., an amplification MOS transistor.

The setting unit 6 sets the electric potential of the charge-voltage converter 8. The setting unit 6 sets a selected state by setting the electric potential of the charge-voltage converter 8 to a first electric potential (V1 in FIG. 4) and sets a deselected state by setting the electric potential of the charge-voltage converter 8 to a second electric potential (V2 in FIG. 4). The setting unit 6 is, e.g., a reset MOS transistor. The first electric potential turns on the output unit (MOS transistor) 7 and needs to be higher than the electric potential necessary for resetting the first photoelectric conversion unit 2. The second electric potential turns off the output unit (MOS transistor) 7 and needs to be lower than the "'electric potential of, e.g., the column signal line 10'+'threshold voltage to turn on the output unit 7 (amplification NMOS transistor)'".

As described above, the pixel unit 1 is selected or deselected in accordance with the electric potential set in the charge-voltage converter 8 by the setting unit 6.

Note that the remaining pixel units 21 and the like are the same as the pixel unit 1.

Figure 2:
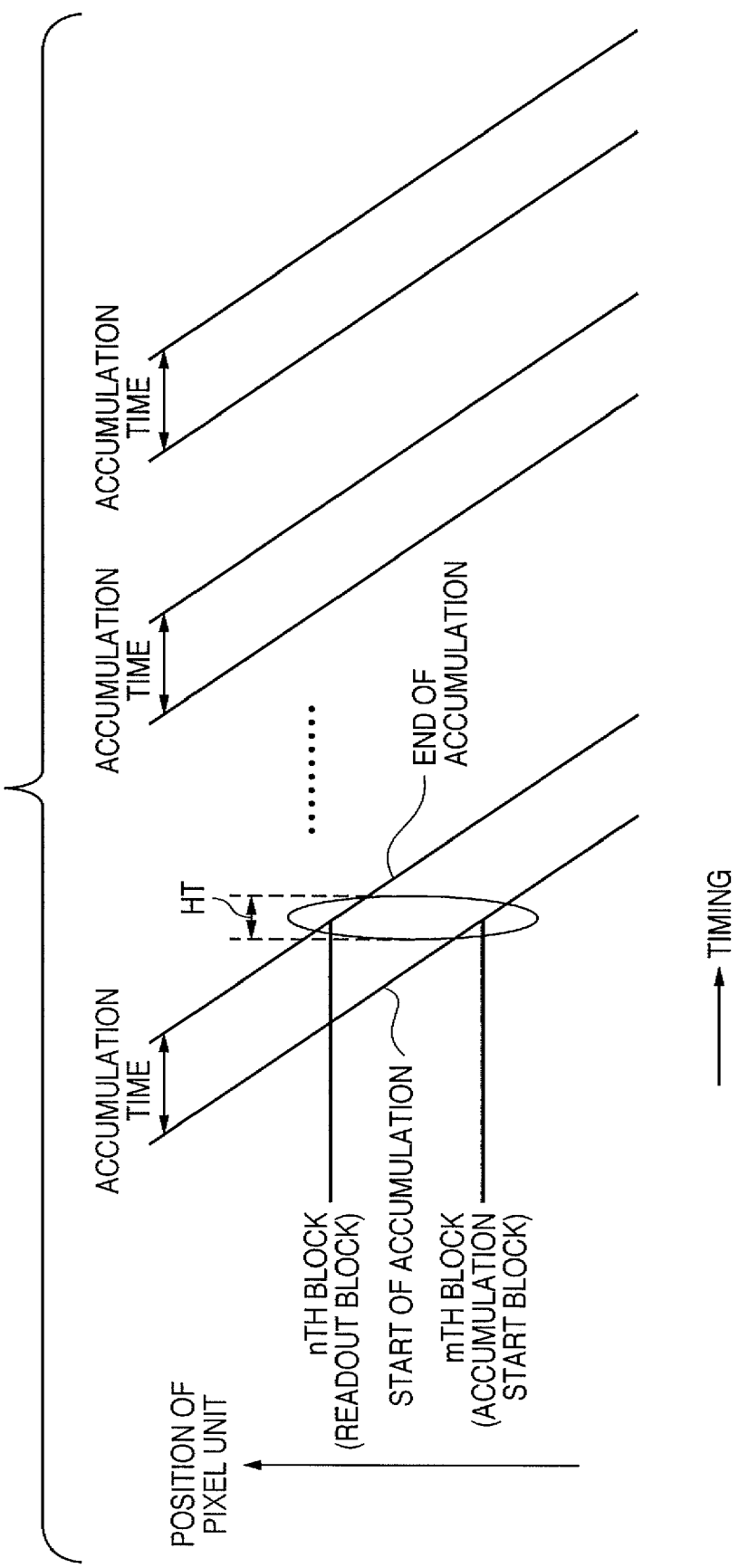
FIG. 2 is a view showing the electronic shutter operation of a driving unit.
Figure 3:
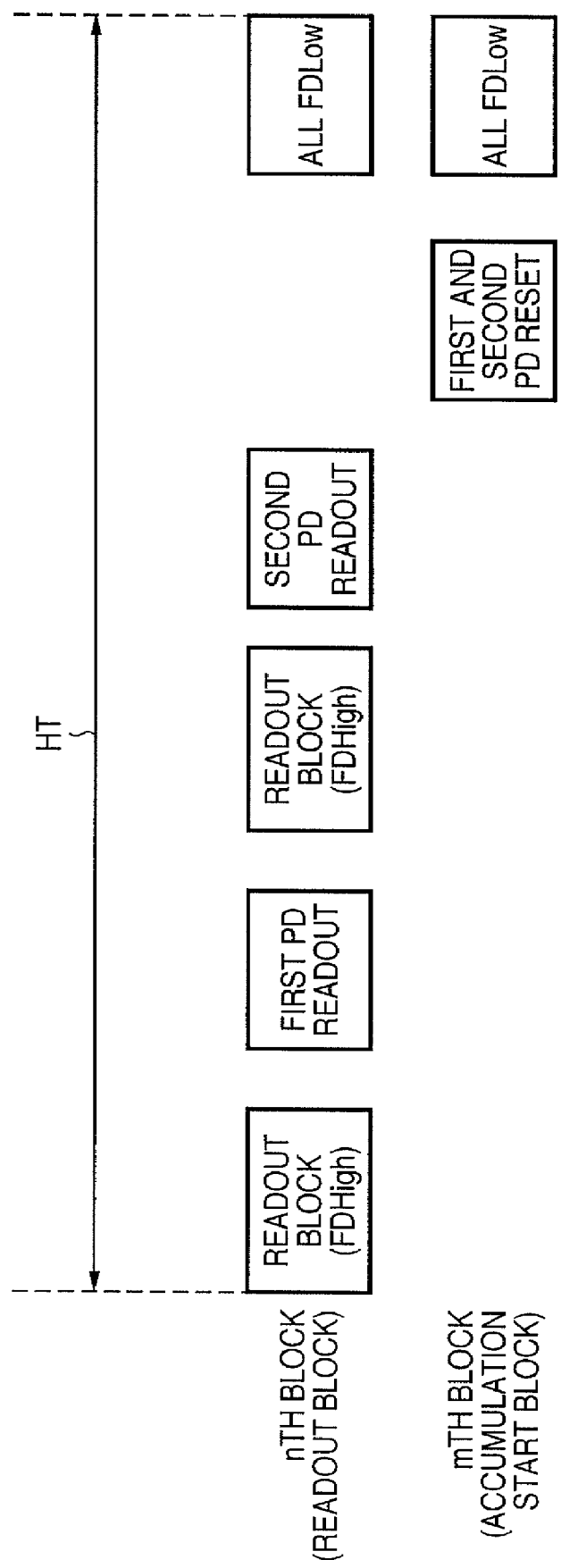
FIG. 3 is a view showing the driving sequence of the driving unit.

The operation of the driving unit 103 of the imaging apparatus 100 will be described next with reference to FIGS. 2 and 3. FIG. 2 is a view showing the electronic shutter operation of the driving unit 103. FIG. 3 is a view showing the driving sequence of the driving unit 103. In FIG. 2, the ordinate represents the positions of pixel units, and the abscissa represents timings. In FIG. 3, the abscissa represents timings.

In the following description, signal readout is done in the nth block, and sweep of accumulated electric charges (reset of photoelectric conversion units) is done in the mth block. A plurality of photoelectric conversion units included in each pixel unit share the output unit (amplification NMOS transistor), and readout of a plurality of rows is performed in one horizontal period HT. Hence, a plurality of rows that execute readout in the same horizontal period HT are expressed as a block.

The driving unit 103 controls the accumulation time of signal electric charges by the electronic shutter operation. More specifically, the driving unit 103 starts the electric charge accumulation operation of each photoelectric conversion unit by resetting each photoelectric conversion unit and ends the electric charge accumulation operation of each photoelectric conversion unit by transferring electric charges accumulated in each photoelectric conversion unit to the charge-voltage converter.

As shown in FIG. 2, the end of accumulation (readout) in a predetermined block (nth block) and the start of accumulation in another block (mth block) are executed in one horizontal period HT. The time from sweep of accumulated electric charges (reset of the photoelectric conversion units) to signal readout is the accumulation time. When m and n are set to appropriate values, an arbitrary accumulation time can be set.

The driving unit 103 drives the pixel unit array PA such that the output unit 7 continuously outputs, to the column signal line 10, a signal based on electric charges generated by the plurality of photoelectric conversion units (2 and 3) in the selected pixel unit (nth block) (indicated by "readout") (FIG. 3). In this case, the driving unit 103 drives the pixel unit array PA such that the output unit 7 continuously outputs the signal based on the electric charges to the column signal line 10 without performing an operation (indicated by "FDLow") of deselecting the selected pixel unit (nth block). The driving unit 103 also drives the pixel unit array PA such that the output unit 7 continuously outputs the signal based on the electric charges to the column signal line 10 via an operation (indicated by "FDHigh") of causing the setting unit 6 to reset the electric potential of the charge-voltage converter 8.

Then, the driving unit 103 drives the pixel unit array PA so as to deselect the plurality of pixel units (nth block and mth block) (indicated by "FDLow") after the output unit 7 continuously outputs the signal based on the electric charges to the column signal line 10.

The driving unit 103 drives the pixel unit array PA so as to reset the plurality of photoelectric conversion units (2 and 3) in the deselected pixel unit (mth block) after the signal based on the electric charges is continuously output before the plurality of pixel units are deselected.

Details of the operation of the driving unit 103 of the imaging apparatus 100 will be described next with reference to FIGS. 4 to 6.

Figure 4:
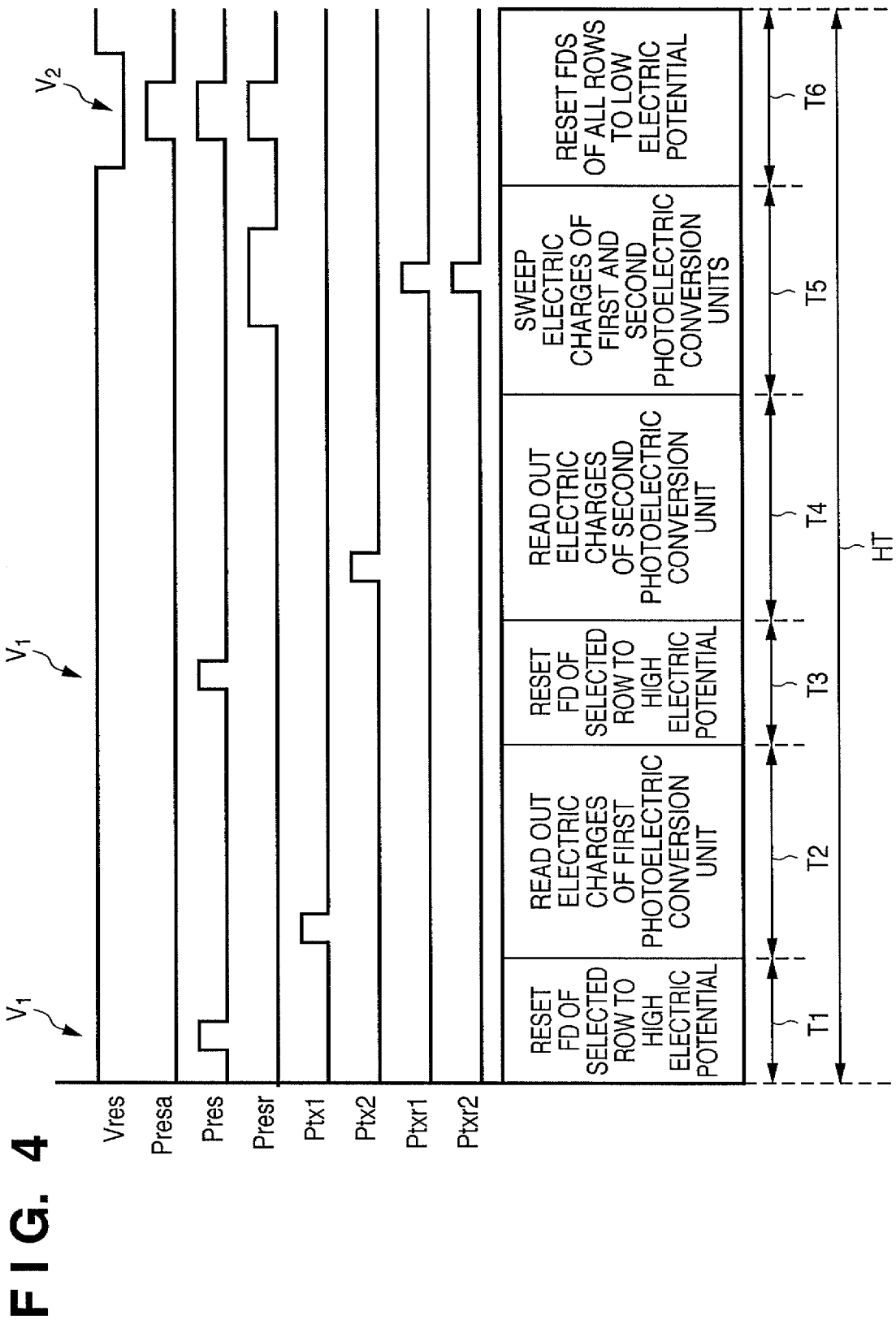
FIG. 4 is a timing chart showing the driving timing of the imaging apparatus according to the embodiment of the present invention.

FIG. 4 is a timing chart showing the driving timing of the imaging apparatus 100 according to the embodiment of the present invention. Referring to FIG. 4, Vres indicates the level of the electric potential input to a global selection signal line 9. Presa is a pulse input to reset driving lines 11 (see FIG. 1) of all blocks except the nth block and mth block. Pres is a pulse input to the reset driving line 11 of the nth block. Presr is a pulse input to the reset driving line 11 of the mth block. Ptx1 is a pulse input to a first electric charge transfer driving line 12 (see FIG. 1) of the nth block. Ptx2 is a pulse input to a second electric charge transfer driving line 13 (see FIG. 1) of the nth block. Ptxr1 is a pulse input to the first electric charge transfer driving line 12 of the mth block. Ptxr2 is a pulse input to the second electric charge transfer driving line 13 of the mth block.

Figure 5:
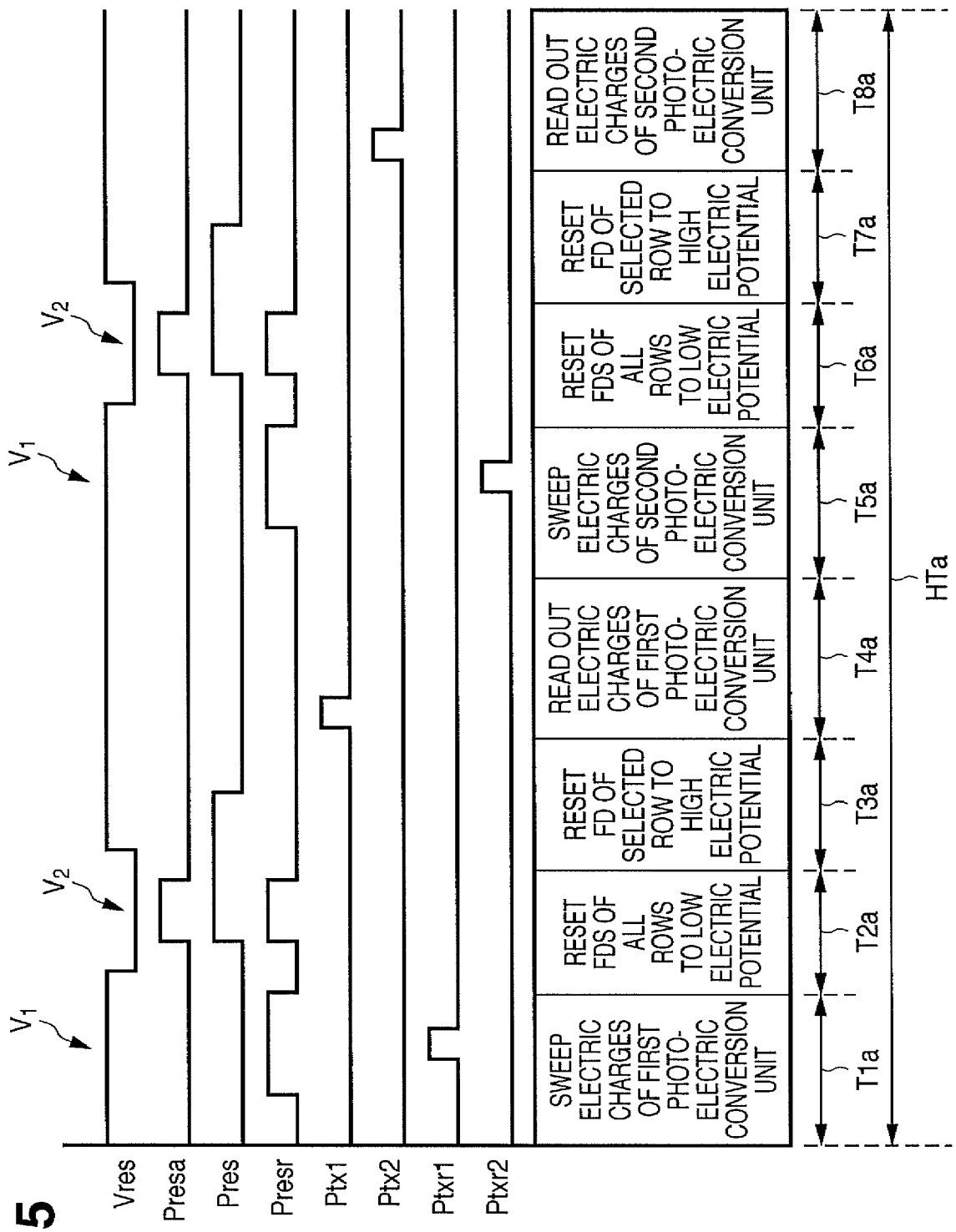
FIG. 5 is a timing chart showing the driving timing of an imaging apparatus according to a comparative example.

FIG. 5 is a timing chart showing the driving timing of an imaging apparatus according to a comparative example.

FIG. 6 is a schematic view showing the comparison between the driving timing in FIG. 4 and that in FIG. 5.

First conditions to select a block to be read out in pixel units without a selection transistor are as follows. The driving unit 103 drives the pixel unit array PA to set the charge-voltage converter 8 of a selected block to the high electric potential (V1) and set the charge-voltage converter 8 of a deselected block to the low electric potential (V2). With this operation, the output unit (transistor) 7 of the selected block is turned on, and the output unit (transistor) 7 of the deselected block is turned off. Hence, the signal of the selected block can be output to the column signal line 10.

Second conditions to sweep accumulated electric charges (reset the photoelectric conversion units) are as follows. The driving unit 103 drives the pixel unit array PA to set the charge-voltage converter 8 to the high electric potential and then turn on the plurality of transfer units (4 and 5). The mth block which performs sweep of accumulated electric charges is different from the nth block which performs readout of signal electric charges. That is, the mth block is a deselected block. When the signal of the nth block is to be read out, the charge-voltage converter 8 of the mth block needs to be set to the low electric potential. More specifically, the charge-voltage converter 8 of the mth block must be set to the high electric potential (V1) in the operation of sweeping accumulated electric charges and to the low electric potential (V2) in reading out the signal electric charges of the nth block.

The driving timings shown in FIGS. 4 and 5 satisfy these conditions.

The driving timing of the imaging apparatus according to the comparative example in FIG. 5 will be described next in detail.

In a period T1a when Vres is at the high electric potential (V1), Presr and Ptxr1 go high. Electric charges accumulated in the first photoelectric conversion unit 2 of the mth block are swept (reset).

In a period T2a when Vres is at the low electric potential V2, Presr, Presa, and Pres go high. The charge-voltage converters 8 of all blocks are set to the low electric potential to deselect the blocks.

Then, in a period T3a when Vres is at the high electric potential V1, Pres goes high. The charge-voltage converter 8 of the nth block is set (reset) to the high electric potential V1 to select the block.

In a period T4a, Ptx1 goes high to read out the electric charges accumulated in the first photoelectric conversion unit 2 of the nth block to the column signal line 10. At this time, correlated double sampling of the electric potential of the column signal line 10 is executed before and after Ptx1 goes high, thereby detecting the amount of electric charges accumulated in the first photoelectric conversion unit 2 of the nth block.

In a period T5a when Vres is at the high electric potential V1, Presr and Ptxr2 go high. Electric charges accumulated in the second photoelectric conversion unit 3 of the mth block are swept (reset).

In a period T6a when Vres is at the low electric potential V2, Presr, Presa, and Pres go high. The charge-voltage converters 8 of all blocks are set to the low electric potential V2 to deselect the blocks.

Then, in a period T7a when Vres is at the high electric potential V1, Pres goes high. The charge-voltage converter 8 of the nth block is set (reset) to the high electric potential V1 to select the block.

In a period T8a, Ptx2 goes high to read out the electric charges accumulated in the second photoelectric conversion unit 3 of the nth block to the column signal line 10. At this time, correlated double sampling of the electric potential of the column signal line 10 is executed before and after Ptx2 goes high, thereby detecting the amount of electric charges accumulated in the second photoelectric conversion unit 3 of the nth block.

As described above, in the driving timing shown in FIG. 5, in a horizontal period HTa to read out electric charges from the first photoelectric conversion unit 2 and second photoelectric conversion unit 3 of the nth block, the electric potential Vres of the global selection signal line 9 is switched twice. The global selection signal line 9 is connected to all pixel units. For this reason, when the number of pixel units increases, the parasitic capacitance of the line increases, and the charge/discharge time becomes long. Hence, a long time is required to switch the electric potential in reading out a signal from a pixel unit. It is therefore difficult to read out a signal from a pixel unit at a high speed.

The electric charge sweep operation of the mth block and switching of the electric potential Vres are done immediately before the period when the signal Ptx1 or Ptx2 for the electric charge readout operation of the nth block goes high. If the electric charge sweep operation or switching of the electric potential Vres causes a transient current to flow, the power supply voltage or the ground potential of the pixels varies. This greatly influences the electric charge readout operation immediately after that. More specifically, shading or the like may occur.

The driving timing of the imaging apparatus according to the embodiment of the present invention shown in FIG. 4 will be described next in comparison with the driving timing of the imaging apparatus according to the comparative example shown in FIG. 5.

In a period T1 when Vres is at the high electric potential V1, Pres goes high. The charge-voltage converter 8 of the nth block is set (reset) to the high electric potential V1 to select the block.

In a period T2, Ptx1 goes high to read out the electric charges accumulated in the first photoelectric conversion unit 2 of the nth block to the column signal line 10. At this time, correlated double sampling of the electric potential of the column signal line 10 is executed before and after Ptx1 goes high, thereby detecting the amount of electric charges accumulated in the first photoelectric conversion unit 2 of the nth block.

In a period T3 when Vres is at the high electric potential V1, Pres goes high. The charge-voltage converter 8 of the nth block is set (reset) to the high electric potential again to keep the block selected.

In a period T4, Ptx2 goes high to read out the electric charges accumulated in the second photoelectric conversion unit 3 of the nth block to the column signal line 10. At this time, correlated double sampling of the electric potential of the column signal line 10 is executed before and after Ptx2 goes high, thereby detecting the amount of electric charges accumulated in the second photoelectric conversion unit 3 of the nth block.

In a period T5 when Vres is at the high electric potential V1, Presr, Ptxr1, and Ptxr2 go high. The electric charges accumulated in the first photoelectric conversion unit 2 and second photoelectric conversion unit 3 of the mth block are swept (reset).

In a period T6 when Vres is at the low electric potential V2, Presr, Presa, and Pres go high. The charge-voltage converters 8 of all blocks are set to the low electric potential to deselect the blocks.

As described above, in the timing shown in FIG. 4, in the horizontal period HT to read out electric charges from the first photoelectric conversion unit 2 and second photoelectric conversion unit 3 of the nth block, the electric potential Vres of the global selection signal line 9 is switched only once. This shortens the time for electric potential switching in reading out a signal from the pixel unit. The horizontal period HT of the embodiment of the present invention can be shorter than the horizontal period HTa of the comparative example (see FIG. 6). It is therefore possible to read out a signal from the pixel unit at a high speed.

Additionally, the electric charge sweep operations of the first photoelectric conversion unit 2 and second photoelectric conversion unit 3 of the mth block are executed simultaneously. This shortens the time of the electric charge sweep operation in reading out a signal from the pixel unit. From this viewpoint as well, the horizontal period HT of the embodiment of the present invention can be shorter than the horizontal period HTa of the comparative example (see FIG. 6). It is therefore possible to read out a signal from the pixel unit at a high speed.

Furthermore, since the number of times of charge/discharge of the global selection signal line 9 also decreases, the consumption current reduces.

The electric charge sweep operation of the mth block and switching of the electric potential Vres are done after the period when the signal Ptx1 or Ptx2 for the electric charge readout operation of the nth block goes high. For this reason, even when the electric charge sweep operation or switching of the electric potential Vres causes a transient current to flow, and the power supply voltage or the ground potential of the pixels varies, the electric charge readout operation is not largely affected. It is therefore possible to reduce shading and obtain a satisfactory image signal.

Note that, in the period T6 shown in FIG. 4, the driving unit 103 may drive the pixel unit array PA to deselect at least the selected pixel unit instead of deselecting all pixel units.

Also note that, although, in each pixel unit of the imaging apparatus, two photoelectric conversion units share the output unit (amplification MOS transistor), the present invention is not limited to this. For example, even when four photoelectric conversion units share the output unit (amplification MOS transistor) in each pixel unit, the same effect as described above can be obtained. In this case, the electric charge sweep operation and switching of the electric potential Vres can be performed every time signals of two blocks are read out, as shown in FIG. 4. Alternatively, the electric charge sweep operation and switching of the electric potential Vres may be done every time signals of four blocks are read out.

As shown in FIG. 7, a period T51 of the operation of sweeping accumulated electric charges in the first photoelectric conversion unit 2 of the mth block may be separated from a period T52 of the operation of sweeping accumulated electric charges in the second photoelectric conversion unit 3 of the mth block. The accumulation time of each photoelectric conversion unit is the time from the electric charge sweep operation to the electric charge readout operation. That is, when the period T51 is separated from the period T52, the accumulation time of the first photoelectric conversion unit 2 and that of the second photoelectric conversion unit 3 can easily be equalized.

Figure 8:
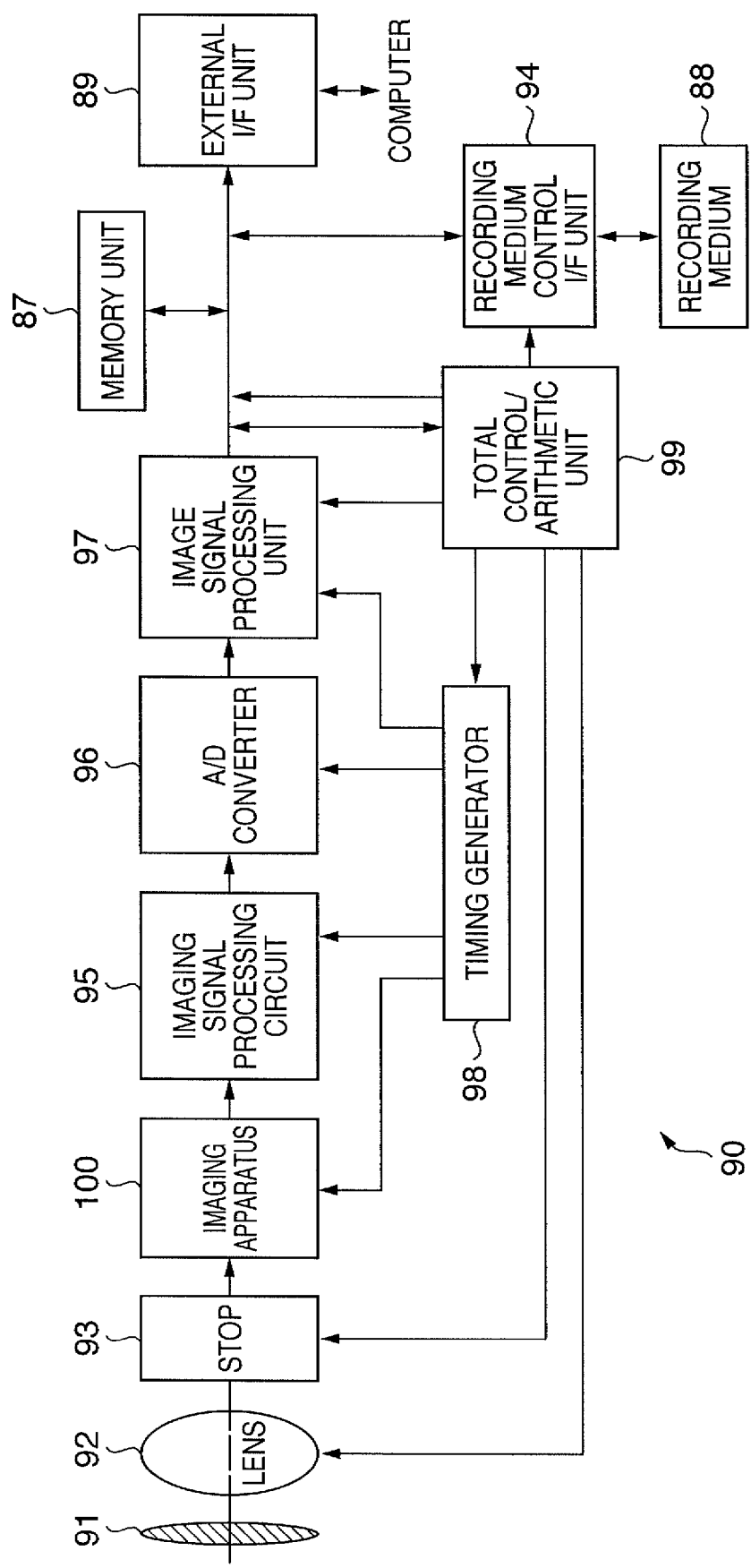
FIG. 8 is a block diagram showing the arrangement of an imaging system using the imaging apparatus according to the embodiment.

FIG. 8 shows an example of an imaging system using the imaging apparatus 100 according to the present invention.

As shown in FIG. 8, an imaging system 90 mainly includes an optical system, the imaging apparatus 100, and a signal processing unit. The optical system mainly includes a shutter 91, photographing lens 92, and stop 93. The signal processing unit mainly includes an imaging signal processing circuit 95, A/D converter 96, image signal processing unit 97, memory unit 87, external I/F unit 89, timing generator 98, total control/arithmetic unit 99, recording medium 88, and recording medium control I/F unit 94. The signal processing unit need not always have the recording medium 88.

The shutter 91 is provided in front of the photographing lens 92 on the optical path to control exposure.

The photographing lens 92 refracts incident light and images an object on the imaging apparatus 100.

The stop 93 is provided between the photographing lens 92 and the imaging apparatus 100 on the optical path to adjust the amount of light guided from the photographing lens 92 to the imaging apparatus 100.

The imaging apparatus 100 converts the object image formed on the pixel unit array PA into an image signal. The imaging apparatus 100 reads out the image signal from the pixel unit array PA and outputs it.

The imaging signal processing circuit 95 is connected to the imaging apparatus 100 to process the image signal output from the imaging apparatus 100.

The A/D converter 96 is connected to the imaging signal processing circuit 95 to convert the processed image signal (analog signal) output from the imaging signal processing circuit 95 into a digital signal.

The image signal processing unit 97 is connected to the A/D converter 96 to execute various arithmetic processes such as correction for the image signal (digital signal) output from the A/D converter 96, thereby generating image data. The image data is supplied to the memory unit 87, external I/F unit 89, total control/arithmetic unit 99, and recording medium control I/F unit 94.

The memory unit 87 is connected to the image signal processing unit 97 to store the image data output from the image signal processing unit 97.

The external I/F unit 89 is connected to the image signal processing unit 97. The image data output from the image signal processing unit 97 is transferred to an external device (e.g., personal computer) via the external I/F unit 89.

The timing generator 98 is connected to the imaging apparatus 100, imaging signal processing circuit 95, A/D converter 96, and image signal processing unit 97 to supply a timing signal to them. The imaging apparatus 100, imaging signal processing circuit 95, A/D converter 96, and image signal processing unit 97 operate in synchronism with the timing signal.

The total control/arithmetic unit 99 is connected to the timing generator 98, image signal processing unit 97, and recording medium control I/F unit 94 to control them.

The recording medium 88 is detachably connected to the recording medium control I/F unit 94. The image data output from the image signal processing unit 97 is recorded in the recording medium 88 via the recording medium control I/F unit 94.

The above-described arrangement allows to obtain a satisfactory image (image data) if the imaging apparatus 100 obtains a satisfactory image signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-053340, filed Mar. 2, 2007 which is hereby incorporated by reference herein in its entirety.

What is claimed is:

1. A method of driving an imaging apparatus, the imaging apparatus including a pixel unit array having a plurality of pixel units arrayed two-dimensionally, each pixel unit including a plurality of photoelectric conversion units, a charge-voltage converter common to the plurality of photoelectric conversion units, a plurality of transfer units, which transfer electric charges generated by the plurality of photoelectric conversion units to the charge-voltage converter, an output unit, which outputs a signal based on the electric charges transferred to the charge-voltage converter to a signal line, and a setting unit, line, and a setting unit which sets an electric potential of the charge-voltage converter, and each pixel unit being selected or deselected in accordance with the electric potential set in the charge-voltage converter by the setting unit, the method comprising:

- a first step of driving the pixel unit array so that an output unit in a selected pixel unit has continuously output, to the signal line, signals based on electric charges generated by the plurality of photoelectric conversion units in the selected pixel unit without performing an operation of deselecting the selected pixel unit;
- a second step of, after the first step, driving the pixel unit array so that a setting unit in a deselected pixel unit resets the plurality of photoelectric conversion units in the deselected pixel unit; and
- a third step of, after the second step, driving the pixel unit array so that the selected pixel unit is deselected.

2. The method according to claim 1, wherein the second step includes driving the pixel unit array such that the setting unit in the deselected pixel unit simultaneously resets the plurality of photoelectric conversion units in the deselected pixel unit.

3. The method according to claim 1, wherein the second step includes driving the pixel unit array such that the setting unit in the deselected pixel unit continuously resets the plurality of photoelectric conversion units in the deselected pixel unit.

4. The method according to claim 1, wherein the second step includes driving the pixel unit array such that the plurality of photoelectric conversion units in the deselected pixel unit start charge accumulation operations by completing the reset operations of the plurality of photoelectric conversion units in the deselected pixel unit.

5. The method according to claim 1, wherein the third step includes driving the pixel unit array to deselect the plurality of pixel units in the selected pixel unit.

* * * * *